US006755714B1

(12) United States Patent
Huddleston

(10) Patent No.: US 6,755,714 B1
(45) Date of Patent: Jun. 29, 2004

(54) REMOTELY OPERABLE GAME CALLER

(76) Inventor: Jerry R. Huddleston, 1685 Victor Ave., Ypsilanti, MI (US) 48198

( * ) Notice: Subject to any disclaimer, the term of this patent is extended or adjusted under 35 U.S.C. 154(b) by 596 days.

(21) Appl. No.: 09/651,328

(22) Filed: Aug. 30, 2000

(51) Int. Cl.[7] .................................................. A63H 5/00
(52) U.S. Cl. ........................................ 446/207; 446/397
(58) Field of Search .......................... 446/26, 188, 197, 446/207, 208, 213, 397

(56) References Cited

U.S. PATENT DOCUMENTS 3,968,592 A * 7/1976 Piper .......................... 446/193
4,335,539 A * 6/1982 Jones .......................... 446/204
5,402,102 A 3/1995 Lachance ................. 340/404.1
5,431,590 A 7/1995 Abbas ......................... 446/207
5,572,592 A 11/1996 Muckelrath .................. 381/56
5,582,530 A * 12/1996 Ady ........................... 446/209
5,613,891 A * 3/1997 Lamo .......................... 446/26
5,643,039 A * 7/1997 McIntyre .................... 446/208
5,735,725 A * 4/1998 Primos ....................... 446/207
5,964,054 A 10/1999 Galfidi, Jr.
5,975,978 A * 11/1999 Hall ........................... 446/208
6,042,447 A * 3/2000 Thompson .................. 446/193
6,053,793 A 4/2000 Green ........................ 446/192
6,179,684 B1 * 1/2001 Carlton ....................... 446/207
6,231,417 B1 * 5/2001 Palmer ....................... 446/207
6,240,671 B1 * 6/2001 Galfidi .......................... 42/90

* cited by examiner

*Primary Examiner*—Kurt Fernstrom
(74) *Attorney, Agent, or Firm*—Gifford, Krass, Groh, Sprinkle, Anderson & Citkowski, PC

(57) ABSTRACT

A remotely operable game call utilizes an air tube for remote operation. The invention is applicable to any type of blow-through or inhale call, including grunt tubes for deer, predator calls, screech calls, doe bleats, and other types of exhale units. An air reservoir provides a number of desirable functions, including the containment of a pressurized volume of air to sufficient to operate the call to produce the sound for which it was intended by blowing on directly by a user. In addition, the use of a reservoir having an inlet and an outlet, allows the outlet to be designed with a substantial universal fitting, enabling different kinds of calls to be attached to the reservoir in an interchangeable manner. As an option, the reservoir and call may be contained in a breathable, preferably camouflaged bag to visibly obscure the apparatus in the field. If desired, the bag may be of a drawstring variety, enabling the entire assembly, including the air tube, to be contained therein during periods of non-use.

15 Claims, 1 Drawing Sheet

116 114 102 150 130 140 122 120 108 106 104 113 109 110 112

REMOTELY OPERABLE GAME CALLER

FIELD OF THE INVENTION

This invention relates generally to game calls of the type used to attract animals while hunting and, in particular, to a forced-air or inhale game call which may be remotely operated.

BACKGROUND OF THE INVENTION

When hunting, it is often advantageous to use an animal call to attract game. There are numerous blow-through inhale/exhale calls available, including grunt tubes for deer, screech calls, doe bleats, and predator calls.

At times it is desirable to operate such a call in a hand's free manner. Toward this end, U.S. Pat. No. 5,964,054 resides in a weapon mounted wild animal game caller which finds particular application in attracting deer. The caller, which may be mounted and attached to an archery bow or to a hunting firearm, emits a grunting sound which is desirable for short range hunting, making it the choice for many bow hunters. The activation of sound is accomplished with an air reservoir that is filled with a resilient filamentous polyester type fiber. When mounted to an archer's bow, it may be operated with the hand even with a fully drawn bow. In an alternative embodiment, the game caller uses an electronic recording system to store a plurality of prerecorded calls, such as deer, geese, duck and the like. The recording media may be either a magnetic tape recorder or a digital synthesizer having a plurality of game calls that are stored in digital memory. The entire game calling system can be worn on one's belt and activated silently by depressing a bow mounted or stock mounted switch.

It is an object of U.S. Pat. No. 5, 613,891 to provide an animal caller that is completely hands-free and mouth-free and is foot-operated by the user for producing a continuous and on-going animal call, leaving the users' upper body area and hands free for taking a proper shot of the animal being sought and called with a bow, gun, or camera. The animal caller includes a bellows assembly for producing a strong current of air disposed within a pouch pocket, and a reed assembly for producing a specific animal sound being detachably connected to the bellows assembly. The reed assembly has detachable and interchangeable reed housings for different animal calls, and the reed assembly has at least two flexible and interlocking calling tubes movable relative to each other to vary the pitch and/or tone of the animal call and to direct the animal call to a given direction.

An apparatus is disclosed in U.S. Pat. No. 5,431,590 for calling game animals when a user is hunting with an archery bow. The apparatus comprises a main body connectable to the archery bow, and a conduit. A first end of the conduit is attached to the main body, and a second end of the conduit is attached to a bow string of the archery bow. A game attracting call can thereafter be produced when the user either draws or blows air through the conduit, such as by causing a reed in the main body to vibrate.

On occasion, it is desirable to attract an animal to a clearing or other location remote from the position of the hunter. Remotely controlled game calls have been therefore been invented for this purpose. For example, U.S. Pat. No. 5,572,592 is directed to remote control audio apparatus for use by hunters having the capability of either recording or reproducing predator calls, game calls and the like. Audio reproduction and/or recording apparatus is disposed within a weather resistant enclosure. A radio transmitter and receiver is provided for generating, transmitting and receiving operating radio signals under manual control for remotely operating the audio apparatus. The radio remote control receiver is detachable from the audio apparatus. In one embodiment, a weather resistant external speaker may be stored within the weather resistant enclosure or detachably mounted to the exterior of the weather resistant enclosure.

Some remotely controllable device employ a string pulled at a distance. U.S. Pat. No. 5,402,102, for example, teaches a device, which is operated at a distance by pulling on a string acting upon a bellows, for blowing a stream of air under pressure into a game caller.

U.S. Pat. No. 6,053,793 discloses a game call blowing device for blowing air through a forced air game call remote from a user. One end of an elongate flexible cord is coupled to the top face of a sound-producing canister. The other end of the flexible cord may be grasped by the hand of the user or secured to the clothing of the user such as to the belt of the user. In use, the pulling of the cord moves an annular disk towards the bottom face of the canister, thereby forcing air in the canister between the annular disk and the bottom face of the canister into the tube from the first end of the tube and out of the tube through the second end of the tube.

SUMMARY OF THE INVENTION

This invention improves upon the existing art by providing a remotely operable game call utilizing an air tube as opposed to a string or other device for remote operation. This offers several advantages, including the fact that the air tube remains stationary during use, and does not get tangled in brush or rustle leaves which might alert an animal to a hunter's presence. The invention is applicable to any type of blow-through or inhale call, including grunt tubes for deer, predator calls, screech calls, doe bleats, and other types of exhale units.

An important aspect of the invention is the inclusion of an air reservoir coupling the air tube to the call itself. The reservoir provides a number of desirable functions, including the containment of a volume of air to sufficient to operate the call to produce the sound for which it was intended by blowing on directly by a user. In addition, the use of a reservoir having an inlet and an outlet allows the outlet to be designed with a substantial universal fitting, enabling different kinds of calls to be attached thereto in an interchangeable manner, in addition to being reversed, to facilitate exhale and inhale operation.

In the preferred embodiment, latex or other flexible tubing having a diameter preferably in the range of ⅜ inch to ½ inch O.D., or thereabouts, and preferably with limited wall expansion, to ensure that the air pressure goes to operating the call as opposed to stretching the tube. The reservoir, likewise, is preferably of a semi-stretchable material, such that when fully inflated, it does not expand a significant amount further, again, for an efficient use of the user's breath. As an option, at least the reservoir may be contained in a preferably camouflaged bag to visibly obscure the apparatus in the field. If desired, the bag may be of a drawstring variety, enabling the entire assembly, including the air tube, to be contained therein during periods of non-use.

DETAILED DESCRIPTION OF THE INVENTION

Figure 1:
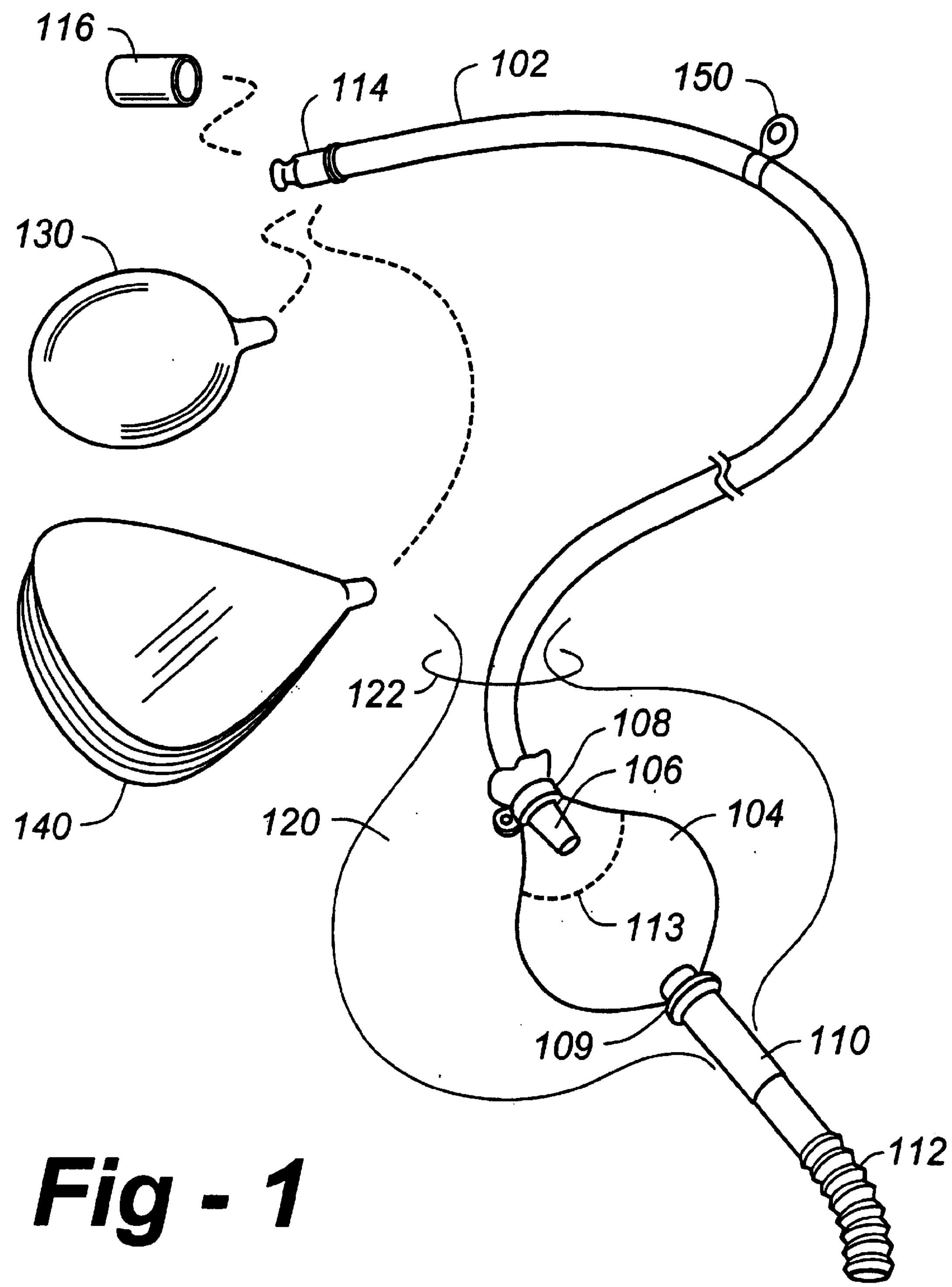
FIG. 1 is a drawing which shows important features of the invention.

The FIGURE illustrates, from a perspective view, a remotely operable game call according to the invention. A length of flexible tube 102, has a proximal end into which a user blows, and a distal end coupled to an air reservoir 104. As used herein, the term "reservoir" shall be taken to mean any type of air-fillable bladder, bulb or other vessel, semi-flexible or substantially rigid, so long as a charge of air is retained sufficient improve the sound of the apparatus as compared to the absence of such a reservoir.

The tube 102 is preferably of a flexible construction while minimizing the extent of wall expansion, enabling a tube having a diameter in the range of ⅜ inch to ½ inch O.D., or thereabouts, to be used affectively at a length of up to 50 feet, or perhaps more. Although not necessary, the tube may include camouflaging colors to further visually obscure the device in the field.

The tube 102 may connect to the reservoir 104 in various ways, including the use of an integral connection. If the reservoir is separate from the tube, an internal rigid tube 106 may be used within overlapping portions of the tube 102 and reservoir 104, enabling a tie mechanism 108 to tightly bind the components together. A game call 110 is removably attached to the air exiting end 109 of the reservoir 104. Again, any type of fastening mechanism may be used, with or without tie wraps, and so forth, depending upon the stability of the connection.

The game call 110 is typically of the type having a rigid blow tube connected to a flexible sound-producing end 112. This structure is shown as representative, however, since the invention is not limited to the type of call used, so long as the designed sound or affect is produced. Indeed, the attachment of the call to the reservoir may be reversed to facilitate inhale operation. In such a case, a screen 113 or other element may be used to ensure that the reservoir does not completely collapse when a user inhales.

Preferably, the proximal end of the air tube 102 includes a mouth piece 114 and/or a cap 116 to protect the proximal end when not in use. Assuming sufficient pressure may be obtained, a squeezable bulb 130 or bellows 140 may alternatively be used in place of the mouth piece 114, thereby facilitating hand or foot operation. An eyelet 150 is further preferably provided at a few feet from the proximal end of the air tube 102, so that the air tube 102 may be hung on an appropriate nail, post, and so forth, allowing the proximal end to dangle therefrom for convenient accessibility. A bag 120 may be used to house at least a sound-producing distal end of the assembly, and may be camouflaged to provide visual obscuration. In the event that the bag 120 includes some type of adjustable opening, it may be opened to contain the entire assembly, including the air tube 102 and other devices used at the proximal end thereof.

I claim:

1. Apparatus facilitating the remote operation of a forced-air type game call, comprising:

an air reservoir; and an air tube having a proximal end into which a user exhales or inhales, and a distal end in pneumatic communication with the air reservoir, the game call being pneumatically coupled to the reservoir, and the length of the tube being such that a user may operate the call from a remote location.

2. The apparatus of claim 1, wherein the air reservoir includes a coupling to which the game call removeably attaches, enabling different calls to be interchanged, reversed, or both.

3. The apparatus of claim 1, further including a camouflaged bag to contain at least the reservoir.

4. The apparatus of claim 1, further including a mouthpiece at the proximal end of the air tube.

5. The apparatus of claim 1, further including a bulb or bellows for forcing air into the proximal end of the air tube.

6. The apparatus of claim 1, further including a connector located proximate the proximal end enabling the proximal end to be conveniently suspended with respect to a user.

7. The remotely operable game call of claim 1, further including a screen or other element disposed within the reservoir to ensure that the reservoir does not over-deflate if a user inhales.

8. A remotely operable game call, comprising:

an inhale or exhale type game call;

an air reservoir having first and second air ports;

an air tube having a proximal end into which a user exhales or inhales, and a distal end pneumatically connected to the first port of the air reservoir;

the game call being pneumatically coupled to the second port of the air reservoir, and the length of the tube being such that a user may operate the call from a remote location.

9. The remotely operable game call of claim 8, wherein the reservoir includes a coupling to which the game call removeably attaches, enabling different calls to be interchanged, reversed, or both.

10. The remotely operable game call of claim 8, further including a camouflaged bag to contain at least the reservoir.

11. The remotely operable game call of claim 8, further including a mouthpiece at the proximal end of the air tube.

12. The remotely operable game call of claim 8, further including a bulb or bellows for forcing air into the proximal end of the air tube.

13. The remotely operable game call of claim 8, further including a connector located proximate the proximal end enabling the proximal end to be conveniently suspended with respect to a user.

14. The remotely operable game call of claim 8, wherein the game call is a blow-through call, grunt tube, predator call, screech call, or doe bleat.

15. The remotely operable game call of claim 8, further including a screen or other element disposed within the reservoir to ensure that the reservoir does not over-deflate if a user inhales.

* * * * *